(12) United States Patent
Mok et al.

(10) Patent No.: US 7,519,287 B2
(45) Date of Patent: Apr. 14, 2009

(54) ELECTRONIC FLASH, IMAGING DEVICE AND METHOD FOR PRODUCING A FLASH OF LIGHT HAVING A RECTANGULAR RADIATION PATTERN

(75) Inventors: Thye Linn Mok, Penang (MY); Wooi Kin Goon, Penang (MY); Gim Eng Chew, Penang (MY); Kee Yean Ng, Penang (MY); Janet Bee Yin Chua, Perak (MY); Rene P. Helbing, Palo Alto, CA (US)

(73) Assignee: Avago Technologies ECBU IP (Singapore) Pte, Ltd., Singapore (SG)

( * ) Notice: Subject to any disclaimer, the term of this patent is extended or adjusted under 35 U.S.C. 154(b) by 356 days.

(21) Appl. No.: 11/207,385

(22) Filed: Aug. 19, 2005

(65) Prior Publication Data

US 2007/0040097 A1 Feb. 22, 2007

(51) Int. Cl.
G03B 15/03 (2006.01)
H04N 5/222 (2006.01)
(52) U.S. Cl. .......................... 396/155; 348/371
(58) Field of Classification Search .................. 396/62, 396/155, 175, 176, 198; 348/370, 371
See application file for complete search history.

(56) References Cited

U.S. PATENT DOCUMENTS

| 4,356,538 | A |   | 10/1982 | Plummer |
| 4,675,791 | A |   | 6/1987  | Montgomery |
| 4,702,581 | A |   | 10/1987 | Yamada et al. |
| 5,852,751 | A | * | 12/1998 | Kawabata et al. ........... 396/175 |
| 7,052,151 | B2 | * | 5/2006 | Terada et al. .................. 362/16 |
| 7,087,902 | B2 | * | 8/2006 | Wang et al. ............... 250/341.1 |
| 7,113,333 | B2 | * | 9/2006 | Kamijima .................... 359/456 |
| 2003/0180037 | A1 |   | 9/2003 | Sommers |
| 2005/0023987 | A1 | * | 2/2005 | Schneck et al. .......... 315/185 S |

OTHER PUBLICATIONS

Ronald G. Driggers, Encyclopedia of Optical Engineering, vol. 2, CRC, Sep. 1, 2003, pp. 617-624.*

* cited by examiner

Primary Examiner—Rodney E Fuller

(57) ABSTRACT

An electronic flash, imaging device and method for producing flashes of light uses a diffractive optical element to produce a flash of light having a rectangular radiation pattern. The diffractive optical element is configured to diffract light emitted from a light source such that the radiation pattern of the light emitted from the diffractive optical element is rectangular to produce the rectangular flash of light.

19 Claims, 5 Drawing Sheets

ELECTRONIC FLASH, IMAGING DEVICE AND METHOD FOR PRODUCING A FLASH OF LIGHT HAVING A RECTANGULAR RADIATION PATTERN

BACKGROUND OF THE INVENTION

Electronic flashes provide supplemental light for photography to enhance images captured by a camera or other imaging devices. Traditional electronic flashes utilize a bulb filled with gas, such as argon, krypton, neon and xenon, or vapor, e.g., mercury vapor. When a high voltage is applied to the bulb, the gas or vapor is ionized, allowing electrons to flow through the gas or vapor. These electrons excite the atoms of the gas or vapor, which emit light. The wavelength characteristics of the emitted light depends on the gas or vapor in the bulb. In the case of mercury vapor, the emitted light is ultraviolet light, which is usually converted to visible light using fluorescent material since ultraviolet light is typically not desired.

Recently, light emitting diodes ("LEDs") have been improved to a point with respect to operating efficiency where LEDs are now replacing conventional light sources, even bulbs in electronic flashes. A typical LED flash includes one or more LED dies and a lens. The LEDs are attached or mounted onto a substrate within a reflector cup, which reflects the light emitted from the LEDs toward a desired direction. The lens is positioned over the reflector cup to channel the emitted light to a sixty-degree (60°) viewing angle to match the viewing angle of the camera.

As illustrated in FIG. 1, a concern with conventional LED flashes is that the radiation pattern 10 of flashes of light produced by the LED flashes is round or oval. However, the imaging field of view 12 of a camera is rectangular. Since the imaging field of view 12 needs to be within the radiation field 10, a significant portion of the emitted light from the conventional LED flashes is not used when capturing an image of a scene of interest. Thus, flashes of light produced by conventional LED flashes cannot be used efficiently when capturing rectangular images.

In view of this concern, there is a need for an LED flash and method for producing a flash of light that allows the flash of light to be used efficiently by an imaging device, such as a digital camera.

SUMMARY OF THE INVENTION

An electronic flash, imaging device and method for producing flashes of light uses a diffractive optical element to produce a flash of light having a rectangular radiation pattern. The diffractive optical element is configured to diffract light emitted from a light source such that the radiation pattern of the light emitted from the diffractive optical element is rectangular to produce the rectangular flash of light. The rectangular radiation pattern of the flash of light allows the flash of light to be used more efficiently to capture a rectangular image of a scene of interest than a conventional flash of light having a round or oval radiation pattern.

An electronic flash in accordance with an embodiment of the invention comprises a substrate, a light source and a diffractive optical element. The light source is attached to the substrate. The light source is configured to emit light. The diffractive optical element is optically coupled to the light source. The diffractive optical element is configured to diffract the light emitted from the light source such that the radiation pattern of the light emitted from the diffractive optical element is rectangular to produce a flash of light having a rectangular radiation pattern.

An imaging device in accordance with an embodiment of the invention comprises a substrate, a light source, a diffractive optical element and an image sensor. The light source is attached to the substrate. The light source is configured to emit light. The diffractive optical element is optically coupled to the light source. The diffractive optical element is configured to diffract the light emitted from the light source such that the radiation pattern of the light emitted from the diffractive optical element is rectangular to produce a flash of light having a rectangular radiation pattern. The image sensor is configured to electronically capture an image of a scene of interest using the flash of light having the rectangular radiation pattern.

A method for producing flashes of light in accordance with an embodiment of the invention comprises generating light within an electronic flash and diffracting the light using a diffractive optical element of the electronic flash such that the radiation pattern of the light emitted from the diffractive optical element is rectangular to produce a flash of light having a rectangular radiation pattern.

Other aspects and advantages of the present invention will become apparent from the following detailed description, taken in conjunction with the accompanying drawings, illustrated by way of example of the principles of the invention.

DETAILED DESCRIPTION

Figure 1:
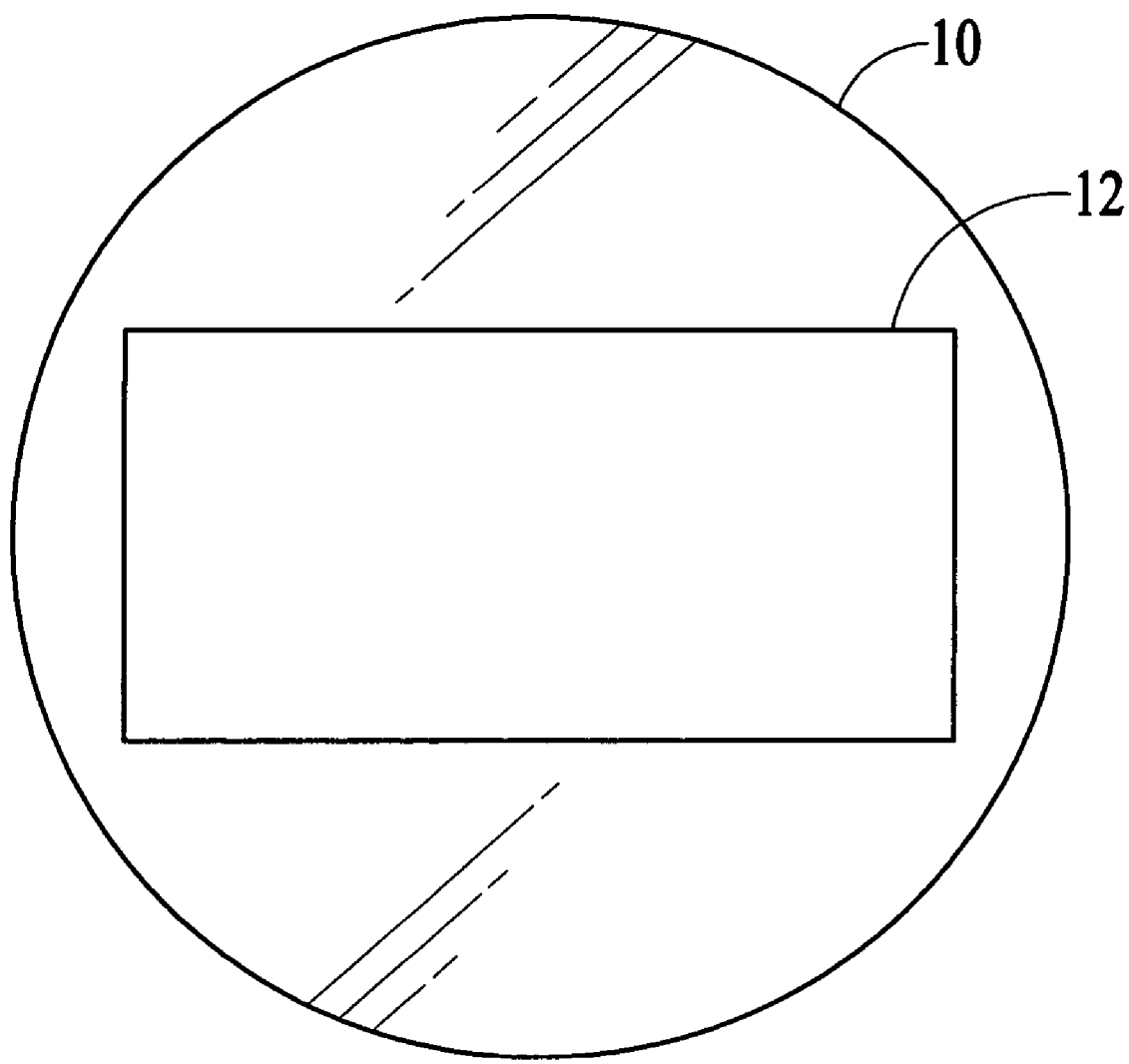
FIG. 1 illustrates a round radiation pattern of flashes of light produced by conventional LED flashes and a rectangular imaging field of view of a camera in accordance with the prior art.
Figure 2:
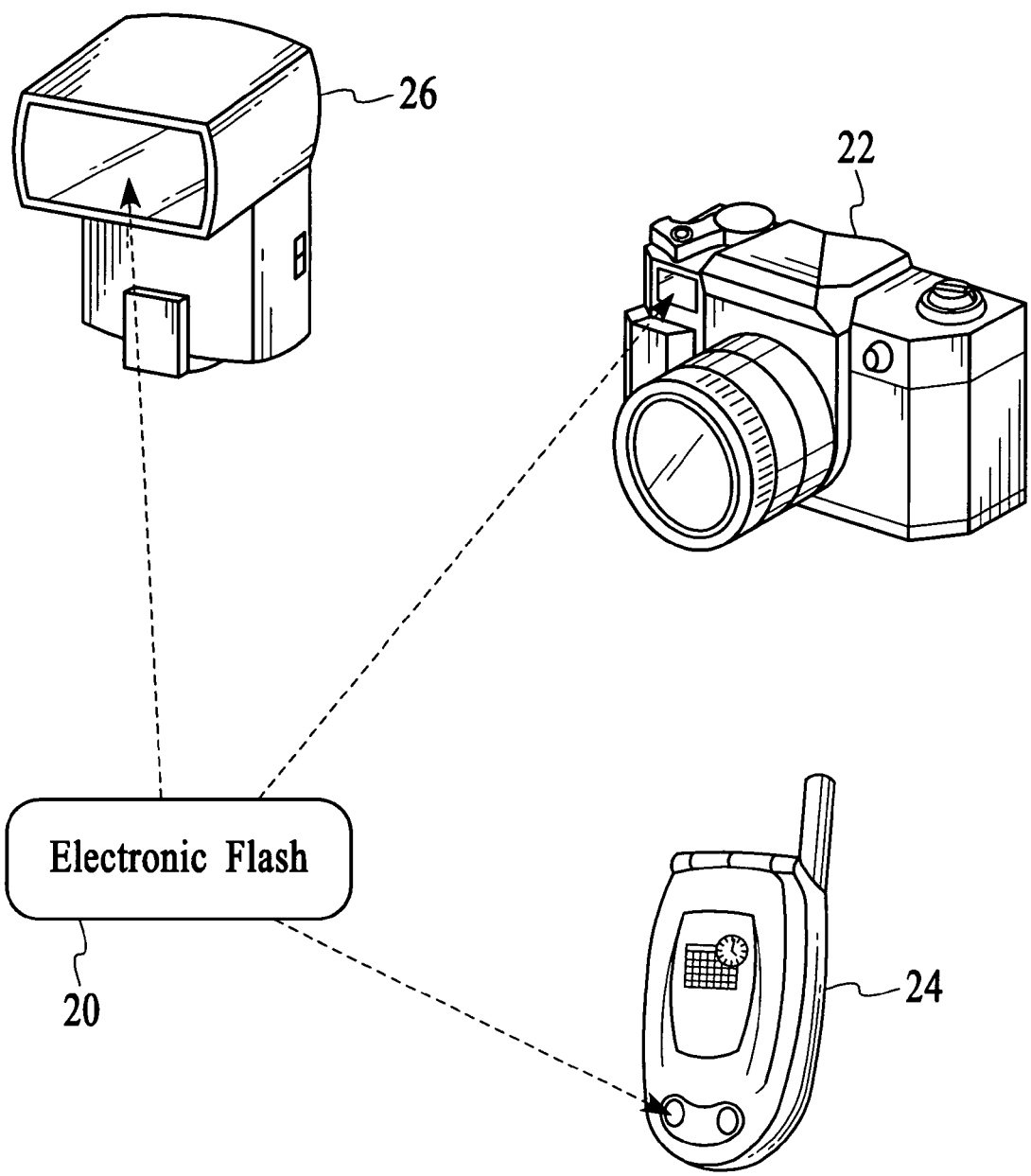
FIG. 2 shows an electronic flash in accordance with an embodiment of the invention, which may be included in a digital camera, a camera phone or an external flash unit.

With reference to FIG. 2, an electronic flash 20 for use in photography in accordance with an embodiment of the invention is described. As shown in FIG. 2, the electronic flash 20 may be included in a digital camera 22, a camera phone 24 or any other imaging device. The electronic flash 20 may also be included in an external flash unit 26 that can be used in connection with an imaging device. The external flash unit 26 may be designed to be attached to an imaging device or to be used as an external device in connection with an imaging device. As described in more detail below, the electronic flash 20 is designed to produce a flash of light having a rectangular radiation pattern to more closely match the imaging field of view of an imaging device so that the flash of light is used more efficiently.

Figure 3:
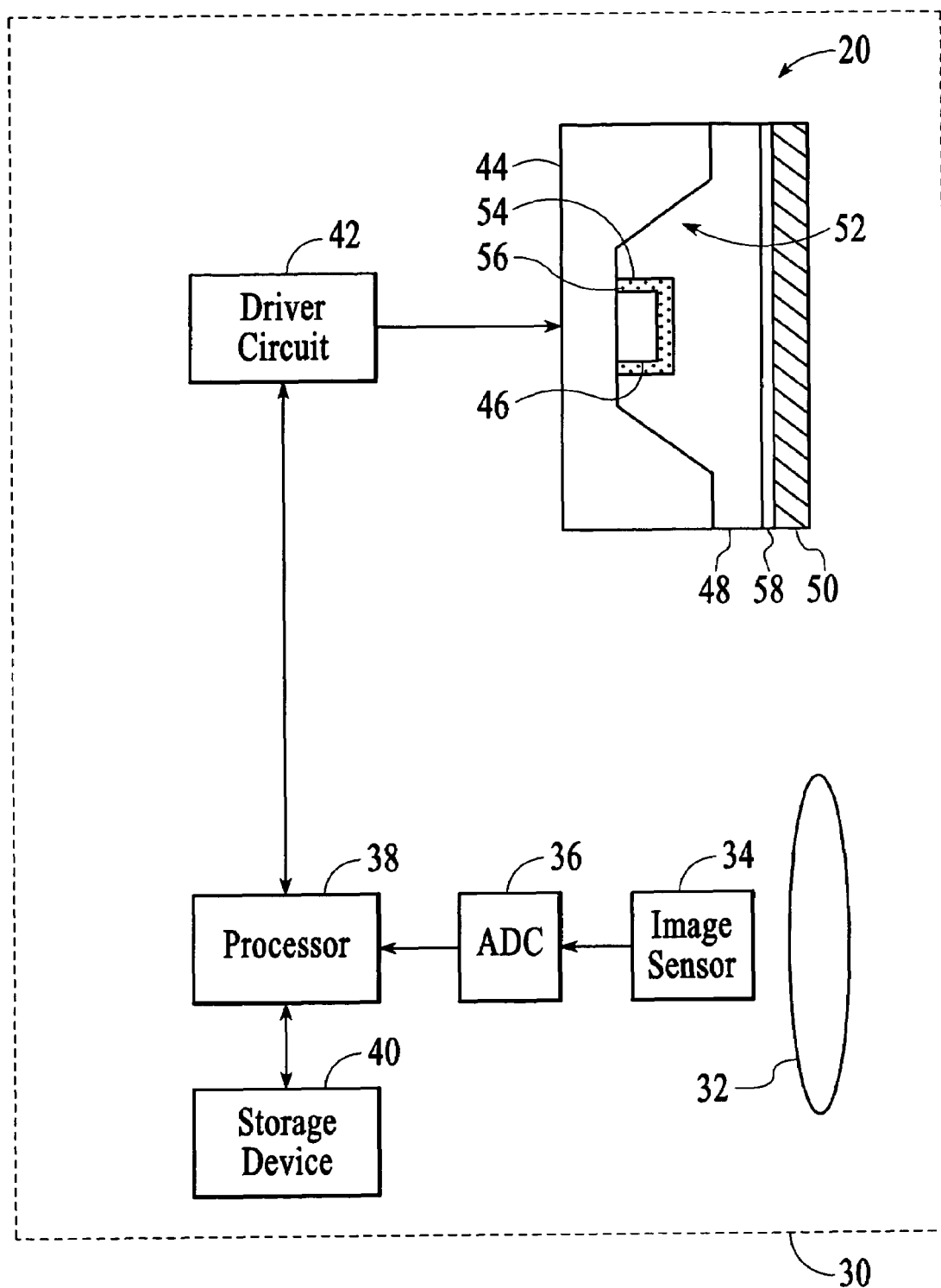
FIG. 3 is a diagram of a digital imaging device with the electronic flash in accordance with an embodiment of the invention.

Turning now to FIG. 3, a digital imaging device 30 with the electronic flash 20 in accordance with an embodiment of the invention is shown. In this embodiment, the electronic flash 20 is incorporated into the digital imaging device 30, which may be a digital camera or a camera phone. As shown in FIG. 3, the imaging device 30 includes a lens 32, an image sensor 34, an analog-to-digital converter (ADC) 36, a processor 38, a storage device 40, a driver circuit 42 and the electronic flash 20. The imaging device 30 may also include other components that are commonly found in conventional digital imaging devices, but are not illustrated or described herein. The lens 32 is used to focus a scene of interest onto the image sensor 34 to capture a rectangular image of that scene. The image sensor 34 operates to electronically capture the focused scene within a prescribed rectangular field of view 62, illustrated in FIG. 4, by generating an electrical charge at each pixel of the image sensor in response to received light at that pixel. As an example, the image sensor 34 may be a Charged Coupled Device (CCD) or a metal-oxide semiconductor (MOS) image sensor. The electrical charges generated by the image sensor 34 are converted to digital signals by the ADC 36 for signal processing.

The processor 38 of the imaging device 30 processes the digital signals from the ADC 36 to produce a rectangular digital image of the captured scene of interest. The processes performed by the processor 38 may include demosaicing, image enhancements and compression. The resulting rectangular digital image is stored in the storage device 40, which may include a removable memory card.

The driver circuit 42 of the imaging device 30 is connected to the electronic flash 20 to provide electrical power needed to activate the electronic flash. The driver circuit 42 is also connected to the processor 38, which controls the driver circuit. In the illustrated embodiment, the driver circuit 42 is shown to be external to the electronic flash 20. However, in other embodiments, the driver circuit 42 may be incorporated into the electronic flash 20.

As shown in FIG. 3, the electronic flash 20 includes a substrate 44, a light source 46, an encapsulant 48 and a diffractive optical layer 50. The substrate 44 provides structural support for the electronic flash 20. The substrate 44 includes a depression 52 that forms a reflector cup. The light source 46 is mounted onto the substrate 44 within the reflector cup 52. Thus, some of the light emitted from the light source 46 will be reflected off the surface of the reflector cup 52 in a direction normal to the top surface of the light source toward the diffractive optical layer 50. In this embodiment, the light source 46 is a light emitting diode (LED) die. As an example, the light source 46 may be a blue emitting LED die. As another example, the light source 46 may be a ZnSe-based LED die that emits white light. However, the light source 46 can be any type of a light generating device, such as a laser diode. The LED die 46 is electrically connected to the driver circuit 42 to receive electrical power to generate light.

The LED die 46 is encapsulated in the encapsulant 48, which is a medium for the propagation of light emitted from the LED die. Thus, the encapsulant 48 is positioned on the substrate 44 and fills the reflector cup 52 of the substrate. The encapsulant 48 can be made of any transparent substance. As an example, the encapsulant 48 can be made of epoxy, silicone, a hybrid of silicone and epoxy, amorphous polyamide resin or fluorocarbon, glass and/or plastic material.

In the illustrated embodiment, the encapsulant 48 includes a wavelength-shifting region 54, which is also a medium for propagating light, made of a mixture of a transparent substance and a photoluminescent material 56. The photoluminescent material 56 in the wavelength-shifting region 54 is used to convert some of the original light emitted by the LED die 46 to lower energy (longer wavelength) light in order to produce different color light, such as white light. However, if the LED die 46 is a white emitting ZnSe-based LED die, then the wavelength-shifting region 54 may not be needed. The photoluminescent material 56 in the wavelength-shifting region 54 may be composed of one or more different types of inorganic phosphors, one of more different types of organic phosphors, one or more different types of fluorescent organic dyes, one or more different types of hybrid phosphors, one or more different types of nano-phosphors, one or more different types of quantum dots or any combination of fluorescent organic dyes, inorganic phosphors, organic phosphors, hybrid phosphors, nano-phosphors and quantum dots. A hybrid phosphor is defined herein as a phosphor made of any combination of inorganic phosphors and organic phosphors or dyes. Quantum dots, which are also known as semiconductor nanocrystals, are artificially fabricated devices that confine electrons and holes. Quantum dots have a photoluminescent property to absorb light and re-emit different wavelength light, similar to non-quantum phosphors. However, the color characteristics of emitted light from quantum dots depend on the size of the quantum dots and the chemical composition of the quantum dots, rather than just chemical composition as non-quantum phosphors. Nano-phosphors have similar optical properties as conventional phosphors. However, nano-phosphors are smaller in size than conventional phosphors, but larger than quantum dots. The size of conventional phosphors is in the range of 1-50 microns (typically in the 1-20 micron range). The size of nano-phosphors is smaller than 1 micron, but larger than quantum dots, which may be a few nanometers in size. As an example, the photoluminescent material 56 may be a conventional YAG phosphor, which when used with a blue-emitting LED die can produce white light.

Although the wavelength-shifting region 54 of the encapsulant 48 is shown in FIG. 3 as being rectangular in shape, the wavelength-shifting region may be configured in other shapes, such as a hemisphere. In an embodiment, the entire encapsulant 48 may be a wavelength-shifting region. In this embodiment, the photoluminescent material 56 is distributed throughout the entire encapsulant 48. In another embodiment, the wavelength-shifting region 54 may be a thin coating layer on the LED die 46. In other embodiments, the wavelength-shifting region 54 may not be physically coupled to the LED die 46, and thus, is located at some distance from the LED die. In an embodiment, the wavelength-shifting region 54 may be a thin layer (not shown) positioned at a surface of the encapsulant 48 near the diffractive optical layer 50.

Figure 4:
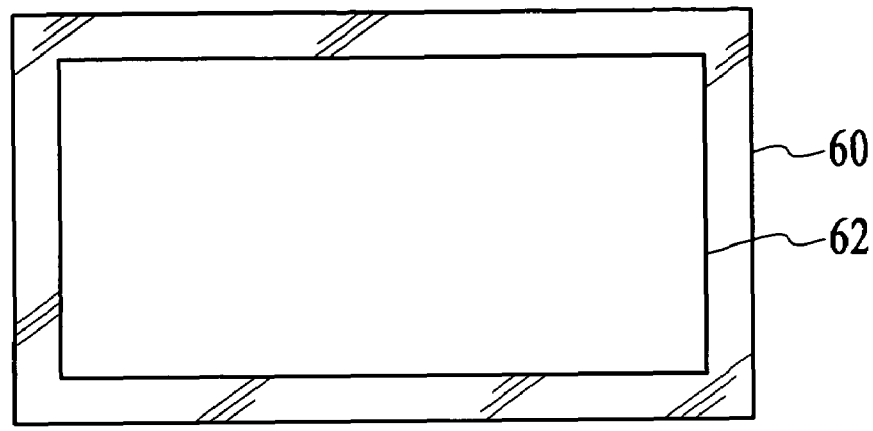
FIG. 4 illustrates a rectangular radiation pattern of a flash of light produced by the electronic flash in accordance with an embodiment of invention.

The diffractive optical layer 50 of the electronic flash 20 is positioned adjacent to the encapsulant 48. The diffractive optical layer 50 is attached to the encapsulant 48 using a transparent adhesive material 58. As an example, optical grade glue can be used as the adhesive material 58 to minimize the light loss due to change in refractive index between the encapsulant 48 and the diffractive optical layer 50. As illustrated in FIG. 4, the diffractive optical layer 50 is a diffractive optical element that is configured to convert the round radiation pattern of the light emitted from the LED die 46 into a rectangular radiation pattern 60, which corresponds to the imaging field of view 62 of the image sensor 34. Thus, the light emitted out of the diffractive optical layer 50 is a flash of light having a rectangular radiation pattern. The diffractive optical layer 50 can be any optical element that performs any kind of wave-front transformation using diffraction to convert a round radiation patterned light into a rectangular radiation patterned light. Alternatively, the diffractive optical layer 50 may be a diffractive diffuser designed using Discrete Fourier Transform (DCT) algorithms to convert a round radiation patterned light into a rectangular radiation patterned light. Such a diffractive diffuser can be produced using Simulated Annealing method (also known as the "IDO" method), which is an error function minimization process, or "Ping-pong" or Projections method, which is an iterative projection process. In an embodiment, the diffractive optical layer 50 may be in the form of a holographic film.

Figure 5:
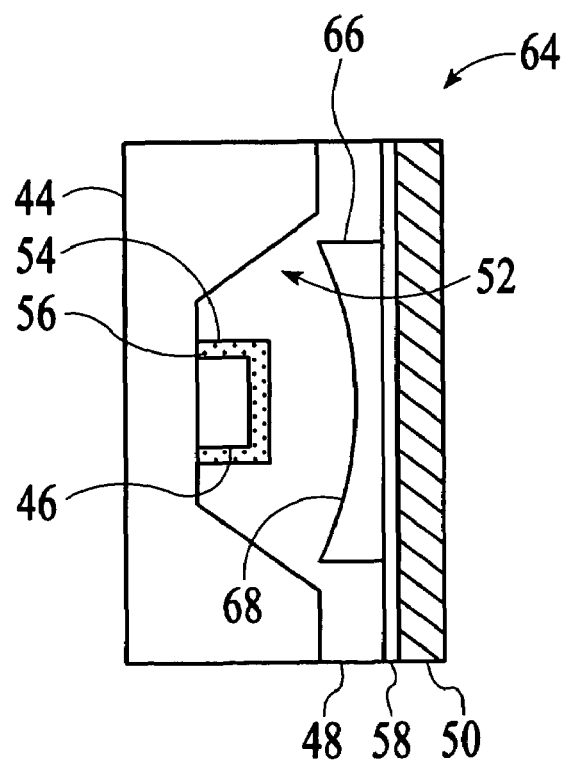
FIG. 5 is a diagram of an electronic flash in accordance with an alternative embodiment of the invention.

The diffractive optical layer 50 works well when the input round radiation patterned light has a narrow viewing angle. Thus, the electronic flash 20 can be enhanced if the light from the LED die 46 is focused prior to being transmitted through the diffractive optical layer 50. Turning now to FIG. 5, an electronic flash 64 in accordance with an alternative embodiment is shown. The same reference numbers of FIG. 3 will be used to identify similar elements in FIG. 5. Similar to the electronic flash 20 of FIG. 3, the electronic flash 64 includes the substrate 44, the light source 46, the encapsulant 48 with the wavelength-shifting region 54 and the diffractive optical layer 50. However, the electronic flash 64 further includes a lens 66 in the form of an optical dome.

The optical dome lens 66 is located between the LED die 46 and the diffractive optical layer 50 within the encapsulant 48, and serves to focus the light emitted from the LED die to narrow the viewing angle of the light prior to being transmitted through the diffractive optical layer. The optical dome lens 66 has a concaved surface 68 that faces the LED die 46. The concaved surface 68 of the optical dome lens 66 converges the light from the LED die 46 to narrow the viewing angle of the light. The optical dome lens 66 may be made of any optically transparent material, such as glass or plastic.

The optical performance of the diffractive optical layer 50 with respect to radiation pattern conversion is improved when the input light has a narrow viewing angle. Since the optical dome lens 66 narrows the viewing angle of light emitted from the LED die 46, the inclusion of the optical dome lens improves the optical performance of the diffractive optical layer 50 to produce a well-defined flash of light having a rectangular radiation pattern.

Figure 6:
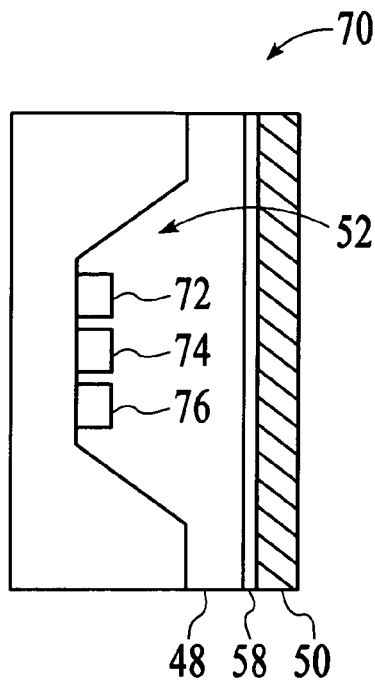
FIG. 6 is a diagram of an electronic flash with multiple light sources in accordance with an embodiment of the invention.

Although the electronic flashes 20 and 64 of FIGS. 3 and 5 have been illustrated and described as including only a single light source, the electronic flashes may includes more than one light source in other embodiments. In FIG. 6, an electronic flash 70 with multiple light sources in accordance with an embodiment of the invention is shown. In FIG. 6, the same reference numbers of FIGS. 3 and 5 are used to identify similar elements. Similar to the electronic flashes 20 and 64 of FIGS. 3 and 5, the electronic flash 70 includes the substrate 44, the encapsulant 48 and the diffractive optical layer 50. However, the electronic flash 70 includes three light sources 72, 74 and 76, e.g., LED dies, that emit different color lights to produce white light. As an example, the light sources 72, 74 and 76 may be red, green and blue LED dies, respectively, that emit red, green and blue lights, which produce white light when mixed.

In operation, the light sources 72, 74 and 76 emit different color lights, e.g., red, green and blue lights, to produce a white flash of light. Some of the emitted light is transmitted directly toward the diffractive optical layer 50, while some of the emitted light is reflected off the reflector cup 52 of the substrate 44 toward the diffractive optical layer. The emitted light is then converted from a round radiation pattern to a rectangular radiation pattern by the diffractive optical layer 50 so that the resulting white flash of light produced by the electronic flash 70 will have a rectangular radiation pattern.

Figure 7:
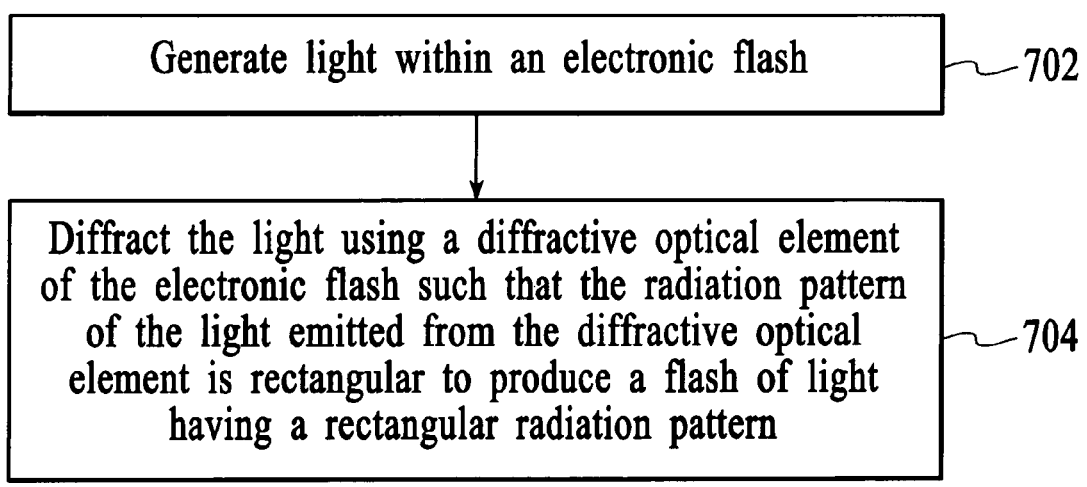
FIG. 7 is a flow diagram of a method for producing a flash of light having a rectangular radiation pattern in accordance with an embodiment of the invention.

A method for producing flashes of light in accordance with an embodiment of the invention is described with reference to FIG. 7. At block 702, light is generated within an electronic flash. The light may be generated by an LED die, such a red, green, blue or white LED die. Next, at block 704, the light is diffracted using a diffractive optical element of the electronic flash such that the radiation pattern of the light emitted from the diffractive optical element is rectangular to produce a flash of light having a rectangular radiation pattern.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. An electronic flash for producing flashes of light, said electronic flash comprising:
   a substrate;
   a light source attached to said substrate, said light source being configured to emit light; and
   a diffractive optical element optically coupled to said light source, said diffractive optical element being configured to diffract said light emitted from said light source such that the radiation pattern of said light emitted from said diffractive optical element is rectangular to produce a flash of light having a rectangular radiation pattern,
   wherein said light source includes a light emitting diode die, wherein said substrate includes a reflector cup in which said light emitting diode die is mounted, and wherein said diffractive optical element is attached to an encapsulant that encapsulates said light source, said encapsulant being positioned on said substrate such that said reflector cup is filled with said encapsulant.

2. The electronic flash of claim 1 wherein said diffractive optical element includes a diffractive holographic film to produce said flash of light having said rectangular radiation pattern.

3. The electronic flash of claim 1 wherein said diffractive optical element includes a diffractive diffuser to produce said flash of light having said rectangular radiation pattern.

4. The electronic flash of claim 1 further comprising a wavelength-shifting region optically coupled to said light source, said wavelength-shifting region including a photoluminescent material to convert some of said light into longer wavelength light.

5. The electronic flash of claim 4 wherein said photoluminescent material includes at least one type of fluorescent organic dyes, inorganic phosphors, organic phosphors, hybrid phosphors, nano-phosphors or quantum dots.

6. The electronic flash of claim 1 further comprising additional light sources that emit light.

7. The electronic flash of claim 6 wherein said light source is a light emitting diode die that emits red light, and wherein each of said additional light sources is light emitting diode die that emits one of green light and blue light.

8. The electronic flash of claim 1 further comprising a lens attached to said diffractive optical element such that said lens is positioned between said light source and said diffractive optical element, said lens being configured to focus said light from said light source to narrow the viewing angle of said light.

9. The electronic flash of claim 8 wherein said lens has a concaved surface that faces said light source.

10. An imaging device comprising:
    a substrate;
    a light source attached to said substrate, said light source being configured to emit light;

a diffractive optical element optically coupled to said light source, said diffractive optical element being configured to diffract said light emitted from said light source such that the radiation pattern of said light emitted from said diffractive optical element is rectangular to produce a flash of light having a rectangular radiation pattern; and an image sensor configured to electronically capture an image of a scene of interest using said flash of light having said rectangular radiation pattern, wherein said light source includes a light emitting diode die, wherein said substrate includes a reflector cup in which said light emitting diode die is mounted, and wherein said diffractive optical element is attached to an encapsulant that encapsulates said light source, said encapsulant being positioned on said substrate such that said reflector cup is filled with said encapsulant.

11. The imaging device of claim 10 wherein said diffractive optical element is a diffractive holographic film to produce said flash of light having said rectangular radiation pattern.

12. The imaging device of claim 10 wherein said diffractive optical element is a diffractive diffuser to produce said flash of light having said rectangular radiation pattern.

13. The imaging device of claim 10 further comprising a wavelength-shifting region optically coupled to said light source, said wavelength-shifting region including a photoluminescent material to convert some of said light into longer wavelength light.

14. The imaging device of claim 13 wherein said photoluminescent material includes at least one type of fluorescent organic dyes, inorganic phosphors, organic phosphors, hybrid phosphors, nano-phosphors or quantum dots.

15. The imaging device of claim 10 further comprising a lens attached to said diffractive optical element such that said lens is positioned between said light source and said diffractive optical element, said lens being configured to focus said light from said light source to narrow the viewing angle of said light.

16. A method for producing flashes of light, said method comprising:

generating light within an electronic flash;

diffracting said light using a diffractive optical element of said electronic flash such that the radiation pattern of said light emitted from said diffractive optical element is rectangular to produce a flash of light having a rectangular radiation pattern; and focusing said light to narrow the viewing angle of said light prior to said light being diffracted by said diffractive optical element.

17. The method of claim 16 further comprising converting some of said light into longer wavelength light using a photoluminescent material.

18. An electronic flash for producing flashes of light, said electronic flash comprising:

a substrate;

a light source attached to said substrate, said light source being configured to emit light;

a diffractive optical element optically coupled to said light source, said diffractive optical element being configured to diffract said light emitted from said light source such that the radiation pattern of said light emitted from said diffractive optical element is rectangular to produce a flash of light having a rectangular radiation pattern; and a lens attached to said diffractive optical element such that said lens is positioned between said light source and said diffractive optical element, said lens being configured to focus said light from said light source to narrow the viewing angle of said light.

19. An imaging device comprising:

a substrate;

a light source attached to said substrate, said light source being configured to emit light;

a diffractive optical element optically coupled to said light source, said diffractive optical element being configured to diffract said light emitted from said light source such that the radiation pattern of said light emitted from said diffractive optical element is rectangular to produce a flash of light having a rectangular radiation pattern;

an image sensor configured to electronically capture an image of a scene of interest using said flash of light having said rectangular radiation pattern; and a lens attached to said diffractive optical element such that said lens is positioned between said light source and said diffractive optical element, said lens being configured to focus said light from said light source to narrow the viewing angle of said light.

* * * * *